(12) United States Patent
Golliher

(10) Patent No.: US 7,273,195 B1
(45) Date of Patent: Sep. 25, 2007

(54) VERTICAL LIFT CRAFT

(76) Inventor: Clayton R. Golliher, 2406 Kent St., Los Angeles, CA (US) 90026

( * ) Notice: Subject to any disclaimer, the term of this patent is extended or adjusted under 35 U.S.C. 154(b) by 58 days.

(21) Appl. No.: 11/229,008

(22) Filed: Sep. 15, 2005

(51) Int. Cl.
  B64C 27/06 (2006.01)
  B64C 27/20 (2006.01)

(52) U.S. Cl. ..................... 244/17.11; 446/36

(58) Field of Classification Search .............. 244/23 C, 244/17.11, 190, 4 A; 446/36, 37; 416/247 R
  See application file for complete search history.

(56) References Cited

U.S. PATENT DOCUMENTS

| | | | | |
|---|---|---|---|---|
| 2,763,428 A | * | 9/1956 | Selah ..................... | 416/247 R |
| 2,935,275 A | * | 5/1960 | Grayson ................... | 244/23 C |
| 2,938,298 A | * | 5/1960 | Apostolescu ............... | 446/37 |
| 3,138,350 A | * | 6/1964 | Lovett, Jr. ................ | 244/23 C |
| 3,204,891 A | * | 9/1965 | Cline ..................... | 244/23 R |
| 3,262,638 A | * | 7/1966 | Militello ................. | 416/247 R |
| 3,395,876 A | * | 8/1968 | Green ..................... | 244/23 C |
| 3,450,374 A | * | 6/1969 | Moore ..................... | 244/5 |
| 4,114,837 A | * | 9/1978 | Pavlecka et al. ............ | 244/26 |
| 5,071,383 A | * | 12/1991 | Kinoshita .................. | 446/37 |
| 5,645,248 A | * | 7/1997 | Campbell ................... | 244/30 |
| 5,672,086 A | * | 9/1997 | Dixon ..................... | 446/37 |
| 2005/0051667 A1 | * | 3/2005 | Arlton et al. ............. | 244/17.11 |

* cited by examiner

Primary Examiner—Rob Swiatek
(74) Attorney, Agent, or Firm—Connolly Bove Lodge & Hutz LLP

(57) ABSTRACT

A vertical lift craft includes a vertical lift craft, a powered rotor system including two counter-rotating lift rotors rotatably mounted to the body and a cage fixed to the body and extending about the powered rotor system, the cage including flexible rods extending in an open mesh pattern and mutually attached at a plurality of intersections between the flexible rods and netting extending between the flexible rods to cover the cage. The mesh pattern includes latitudinally and longitudinally extending flexible rods and the cage further includes elastomeric bumpers at the plurality of intersections between flexible rods. A base has axles fixed relative to the body and wheels on the axles.

11 Claims, 1 Drawing Sheet

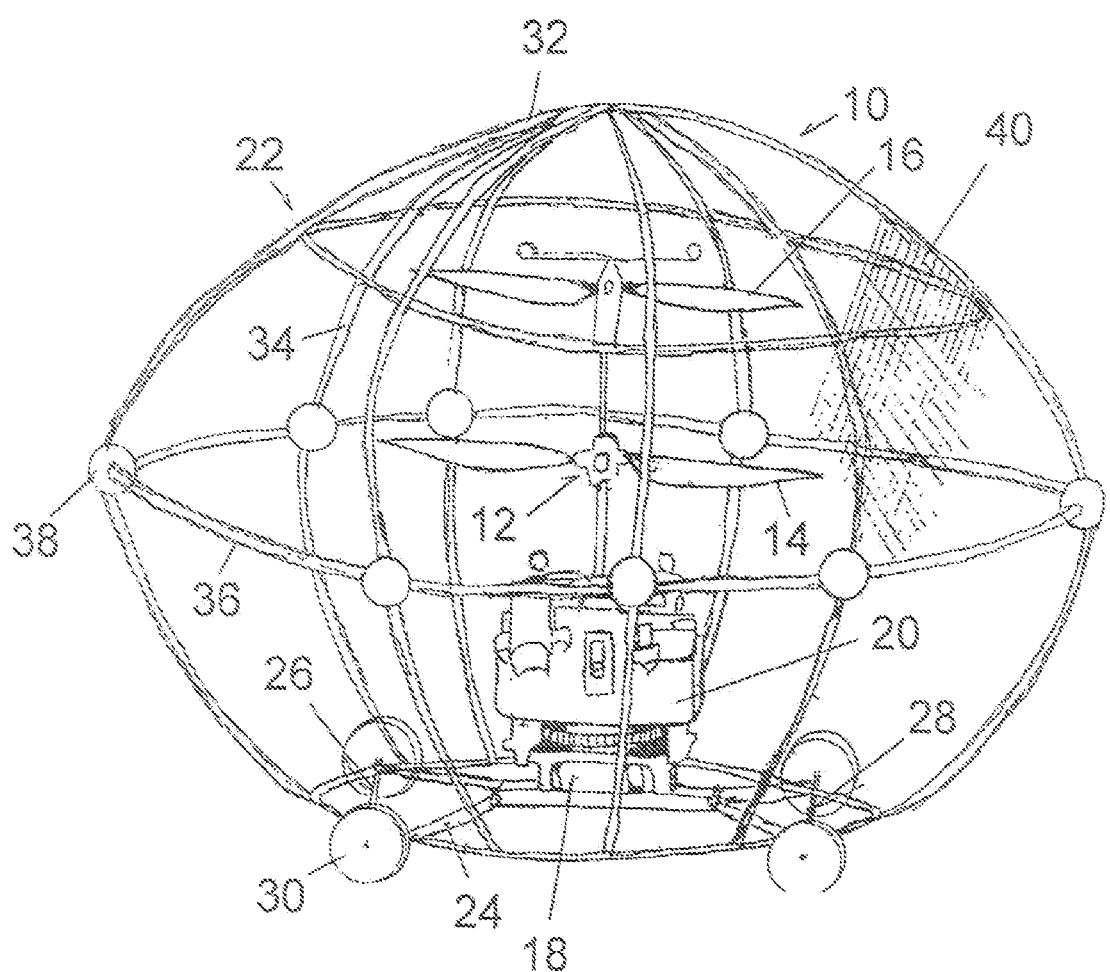

VERTICAL LIFT CRAFT

BACKGROUND OF THE INVENTION

The field of the present invention is model aircraft.

Toys and models are currently available which perform as guided vertical lift craft such as helicopters and the like. Such devices have a body, are battery powered or engine driven and have a powered rotor system having one or more lift rotors. When two rotors are employed, they are advantageously counterrotating to eliminate yaw torque. Such devices range from simple toys to very sophisticated models. The controls associated with such devices also span a wide range from the simple to the sophisticated. Such devices can be controlled by wire but are more frequently controlled by an RF controller.

These vertical lift craft, which can take the form of helicopters, spaceships and the like, have one principal drawback preventing universal applicability in terms of users and environments. The rotors provide a hazard which can limit the propriety of operation to older children and outdoor environments. The rapidly rotating blades can hurt objects entering into the path of travel of the blades, e.g., fingers, lampshades and the like.

SUMMARY OF THE INVENTION

The present invention is directed to vertical lift craft and the methods of their employment. Conventional and available such craft and controllers are contemplated to be employed in combination with cages enclosing at least the powered rotor system.

In a first separate aspect of the present invention, flexible rods are arranged in an open mesh pattern with the rods being mutually attached at intersections therebetween. Netting extends between the flexible rods to cover the cage. The rods and netting are selected to prevent access to the powered lift rotor or rotors.

In a second separate aspect of the present invention, flexible rods are arranged in an open mesh pattern with the rods being mutually attached at intersections therebetween. Netting extends between the flexible rods to cover the cage. The mesh pattern advantageously includes latitudinally and longitudinally extending flexible rods with elastomeric bumpers at the intersections between the flexible rods. Such construction provides a very light, sufficiently rigid cage preventing access to the lift rotor or rotors.

In a third separate aspect of the present invention, a method for isolating a powered rotor system of a vertical lift craft includes creating a flexible cage, affixing netting to the flexible cage, limiting the power of the resulting craft such that it is limited to operating at speeds which do not result in the lift rotor or rotors engaging the flexible cage upon direct impact of the craft against the fixed barrier.

A fourth separate aspect of the present invention includes a method for operating a vertical lift craft including creating a flexible cage about the powered rotor system, affixing netting to the flexible cage and operating the craft at speeds such that the powered rotor system will not engage the flexible cage upon direct impact of the vertical lift craft against a fixed barrier.

In a fifth separate aspect of the present invention, combinations of the foregoing separate aspects are contemplated for further advantage.

Accordingly, it is an object of the present invention to provide an improved vertical lift craft, the isolation of its powered rotor system and improved operation. Other and further objects and advantages will appear hereinafter.

BRIEF DESCRIPTION OF THE DRAWING

The FIGURE is a perspective view of a vertical lift craft.

DETAILED DESCRIPTION OF THE PREFERRED EMBODIMENT

Turning in detail to the FIGURE, a vertical lift craft, generally designated 10, is illustrated as including a body, a powered rotor system and a cage. The powered rotor system, generally designated 12, includes two lift rotors 14, 16 which are counterrotating. The powered rotor system 12 includes a source of rotary power for the lift rotors 14, 16 which includes a battery 18, a motor (not shown) and gearing not shown) to achieve counterrotation of the lift rotors. The source of rotary power is located in a body 20. A mechanism (not shown) for controlling the direction of motion is also contemplated. This powered rotor system 12 is appropriately controlled by a remote controller using RF or flexible wire for communication with the system 12. Such powered rotor systems range from simple inexpensive toys to far more sophisticated models. One such source of the powered rotor system is Hirobo Unlimited of Hiroshima-Perfecture, Japan.

The controls employed for these devices include proportional joy sticks and the like. Certain advantageous control systems are illustrated in U.S. patent application Ser. No. 11/218,341, filed Aug. 31, 2005, to Clayton Golliher and James Moore, entitled CONTROLLER FOR REMOTE VEHICLES AND CRAFT AND FOR VITUAL SUBJECTS, which claims priority to U.S. Provisional Patent Application No. 60/663,532, filed Mar. 18, 2005, the disclosures of which are incorporated herein by reference.

The body 20, shown to be minimal in the FIGURE, may take on any reasonable shape to achieve desired aesthetics. The motor, transmission and battery for the powered rotor system 12 are simply fixed in the body 20 with the body 20 being substantially balanced about a vertical axis coincident with the rotational axis of the lift rotors 14, 16. The body is preferably of light construction with extensive use of foam.

A cage, generally designated 22, is illustrated as extending about the powered rotor system 12 and the body 20. It is, however, contemplated that the body may include such things as wings or other aesthetic components, preferably of lightweight foam, which extend beyond the cage 22.

The cage may be said to include a base defined by rigid struts 24 which are structurally fixed to the body 20. Axles 26, 28 rotatably mounting four wheels 30 are also attached to the rigid struts 24 of the base.

The cage 22 is defined by flexible rods 32 of carbon fiber filled plastic to give appropriate strength with low weight. The flexible rods 32 are arranged in an open mesh pattern which, in the preferred embodiment, includes latitudinally extending rods 34 and longitudinally extending rods 36. These rods 34, 36 intersect one another and at least at a plurality of intersections, the rods 34, 36 are mutually attached together to form an appropriate rounded cage structure with substantial strength. Elastomeric bumpers 38 are provided at the mutual attachments between the latitudinally extending rods 34 and the longitudinally extending rods 36 at least about the equatorial line.

Through empirical trial, the size of the cage and its strength may be defined so as to allow the craft at full speed to directly impact against a fixed barrier without distorting the cage 22 enough to interfere with the lift rotors 14, 16. This is accomplished through balancing the strength of the cage, the weight of the system and the limits of speed achievable by the craft 10.

To prevent small objects such as fingers from penetrating the open mesh pattern, netting 40 extends between the flexible rods 32 which contemplates that any given piece of netting 40 may extend over several of the flexible rods 32. This netting 40 is of a very lightweight material with a very open pattern. Such material can be from conventional fabric stores. The cage 22 is affixed to the rigid struts 24 of the base to complete the structure.

Thus, an improved vertical lift craft, the isolation of its powered rotor system and improved operation have been disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A vertical lift craft, comprising
a base;
a powered rotor system including at least one lift rotor rotatably mounted atop the base;
a cage fixed to the base and extending about and enclosing the powered rotor system, the cage including flexible rods extending in an open mesh pattern and mutually attached at a plurality of intersections between the flexible rods and netting extending between the flexible rods to cover the cage.

2. The vertical lift craft of claim 1, the mesh pattern including latitudinally and longitudinally extending flexible rods.

3. The vertical lift craft of claim 2, the cage further including elastomeric bumpers at the plurality of intersections between flexible rods.

4. The vertical lift craft of claim 1 further comprising
axles fixed relative to the body;
wheels on the axles.

5. The vertical lift craft of claim 1, the powered rotor system including two counter-rotating lift rotors.

6. The vertical lift craft of claim 1, the body including a battery.

7. The vertical lift craft of claim 1 further comprising
an RF receiver and proportional flight controls.

8. The vertical lift craft of claim 1, the cage further extending about the body.

9. A method for isolating a powered rotor system of a vertical lift craft, comprising
creating a flexible cage made up of flexible rods in a mesh pattern extending about the vertical lift craft including attaching the flexible rods together at a plurality of the instructions between the flexible rods;
affixing netting to the flexible cage;
balancing the power to the craft to operate at speeds such that the powered rotor system will not engage the flexible cage upon direct impact of the vertical lift craft against a fixed barrier.

10. A method for operating a vertical lift craft having a powered rotor system, comprising
creating a flexible cage made up of flexible rods in a mesh pattern and extending about the vertical lift craft including attaching the flexible rods together at a plurality of the intersections between the flexible rods;
affixing netting to the flexible cage;
operating the craft at speeds such that the powered rotor system will not engage the flexible cage upon direct impact of the vertical lift craft against a fixed barrier.

11. The method of claim 10 further comprising
controlling the vertical lift craft through radio frequency (RF) controls.

* * * * *

UNITED STATES PATENT AND TRADEMARK OFFICE
CERTIFICATE OF CORRECTION

| | | |
|---|---|---|
| PATENT NO. | : 7,273,195 B1 | Page 1 of 1 |
| APPLICATION NO. | : 11/229008 | |
| DATED | : September 25, 2007 | |
| INVENTOR(S) | : Clayton R. Golliher | |

It is certified that error appears in the above-identified patent and that said Letters Patent is hereby corrected as shown below:

In claim 9 (Column 4, line 17), delete "instructions" and insert -- intersections -- therefor.

Signed and Sealed this

Fourth Day of December, 2007

JON W. DUDAS
*Director of the United States Patent and Trademark Office*